United States Patent [19]

Hardtke

[11] Patent Number: 5,028,019
[45] Date of Patent: Jul. 2, 1991

[54] PIPE SUPPORT

[75] Inventor: Hans H. Hardtke, Zeven, Fed. Rep. of Germany

[73] Assignee: LISEGA GmbH, Fed. Rep. of Germany

[21] Appl. No.: 498,797

[22] Filed: Mar. 26, 1990

[30] Foreign Application Priority Data

Apr. 4, 1989 [DE] Fed. Rep. of Germany ....... 3910757

[51] Int. Cl.$^5$ .............................................. F16L 3/16
[52] U.S. Cl. .......................................... 248/55; 248/49
[58] Field of Search ............................ 248/49, 55, 65; 138/106; 384/36, 48, 50, 52, 58

[56] References Cited

U.S. PATENT DOCUMENTS

| 1,110,128 | 9/1914 | Gray | 248/55 |
|---|---|---|---|
| 1,645,762 | 10/1927 | Lohbiller | 248/55 |
| 3,687,406 | 8/1972 | Krahe | 248/55 |
| 4,244,543 | 1/1981 | Ericson | 138/106 |

FOREIGN PATENT DOCUMENTS

| 1048475 | 12/1953 | France | 384/58 |
|---|---|---|---|
| 414789 | 12/1966 | Switzerland | 248/55 |

Primary Examiner—J. Franklin Foss
Attorney, Agent, or Firm—Diller, Ramik & Wight

[57] ABSTRACT

A pipe support is provided which includes a bearing support defined by a base plate and two upwardly converging legs carrying pins which journal first anti-friction bearings between the legs and second anti-friction bearings outside the legs. A pipe is carried by a pipe support plate supported atop the first anti-friction bearings. The pipe support has ends carrying depending side plates which in turn include projections underlying the second anti-friction bearings which collectively provide free displacement longitudinally of the pipe axis and limited upward movement of the pipe support plate from atop the first bearings.

20 Claims, 1 Drawing Sheet

PIPE SUPPORT

BACKGROUND OF THE INVENTION

The invention relates to a pipe support for supporting pipes and pipe components, and particularly pipes and conduits that move in the direction of the longitudinal axis thereof due to temperature changes. The pipe support is connected to an associated pipe and is supported on anti-friction bearings, such as roller bearings.

In cases where pipes are subject to displacement in a longitudinal direction due to variations in temperature of the medium flowing therethrough or due to the atmosphere surrounding the pipes, bearing blocks supporting roller or ball bearings are used to provide an easy rolling movement during displacement, expansion or contraction of the pipe. The bearings absorb the forces of expansion, contraction or movement, and also support the weight of the pipe or conduit. It is also desirable that such pipes or conduits be prevented from moving too far laterally or upwardly. In other words, while longitudinal movement is compensated for by the bearings, the pipes must not move outside of allowable lateral and upward limits. In this context it is conventional to provide members which extend in the longitudinal direction of the pipe and are connected to both the pipe and the bearings supporting the pipe. In this manner, the pipe can only be lifted off the bearing surface over a relatively short predetermined distance.

It is known, for example, from German Patent 32 16 121 to configure a lift-off structure such that the pipe is connected to at least one rod which is parallel to the direction of pipe movement or thermal expansion/contraction. The length of this rod corresponds at least to the quantity of motion created by the thermal expansion/contraction of movement of the pipe. In this case the rod is guided by means of a recess in the casing walls of the bearing and directly undercuts the roller of the roller bearing on which the pipe rests. The rod is partially subjected to substantial bending forces when the pipe deflects, and such flexural stress on the rod or the bar results in a reduction of the load bearing value. The latter is disadvantageous, as is the complex construction of this system and its inaccessibility for repair and replacement purposes.

SUMMARY OF THE INVENTION

It is an object of the invention to provide a novel support for pipes, conduits and the like which are subject to movement parallel to their longitudinal axis by, for example, thermal expansion or contraction. The bearing support is simple in construction, is easy to access and inspect, and allows a virtually unlimited length of pipe to be supported at a minimum of stress. In pipe supports of the type mentioned heretofore, the invention is particularly characterized in that the pipe support includes a pipe support plate which projects beyond the underlying anti-friction bearings and at opposite ends carries depending side plates having projections directed toward each other and in underlying association to second anti-friction bearing means or castors carried by the bearing pins of the associated first anti-friction bearings. This arrangement not only permits the pipe support plate to shift or slide longitudinally along the first anti-friction bearings as the pipe expands or contracts, but the projections underlying the second anti-friction bearings or castors prevents the pipe from being lifted from atop the associated bearing support. Excessive lateral shifting is also precluded by this construction and virtually any length of pipe can be supported without a reduction in the load bearing capacity of the associated pipe supports.

In further accordance with this invention, the side plates carried by pipe support plate can be permanently secured to the pipe support plate or removably secured thereto. The removable feature of the side plates is particularly advantageous since each can be removed to readily access the castors or second anti-friction bearings which are preferably located between the side plates and associated support arms of the bearing support.

In further accordance with this invention, the second anti-friction bearings or castors are carried by the ends of bearing pins which project beyond legs of bearing supports. Essentially, the castors are sandwiched between an upstanding leg of an associated bearing support and a depending side plate of the pipe support plate. Preferably, the castors are supported loosely rotatably on the projecting ends of the pins which support the second anti-friction bearings and, thus, can be readily inspected, removed, and/or repaired upon the removal of the associated depending side plates. As a whole, this construction is simple, does not create any restriction in the load bearing capacity of the support, and all parts can be readily accessed from the outside, thus permitting ease of assembly and disassembly.

In further accordance with this invention, the pipe support preferably includes a bearing support formed as a base plate having at its opposite ends upstanding arms or legs which cooperate with a central trunnion to support therebetween rollers defining a generally shallow, V-shaped axis of rotation. Bearing pins supporting the rollers project beyond the legs of the bearing support and it is upon these ends that the castors or second anti-friction bearings are supported. Preferably, the angle of these legs corresponds to the angle of the depending side plates of the pipe support plate and confined therebetween the associated castors or second bearings. Since the depending side plates have projections which underlie the castors, the pipe support plate can not be lifted upwardly an appreciable extent due to the contact of the projections with the castors. Likewise, lateral motion is limited due to the depending side plates and their orientation in lateral opposition to the castors. Furthermore, though this construction prevents opposite lateral sides of the pipe support plate from being lifted from the bearing support, this feature can be included on only one side of each pipe support, but preferably in an alternating fashion along the length of a pipeline.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
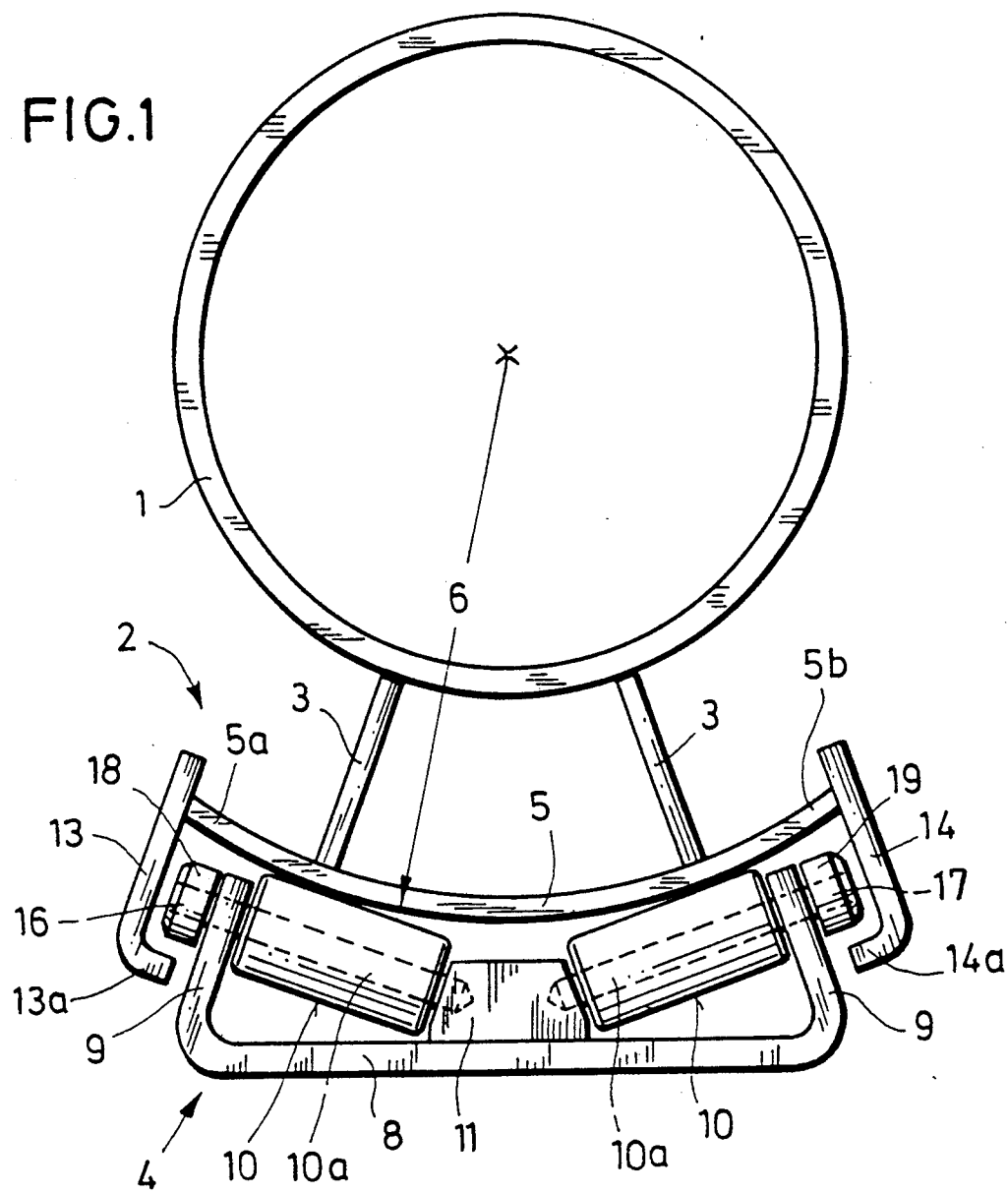
FIG. 1 is a schematic end view of a novel pipe support constructed in accordance with this invention, and illustrates a bearing support carrying first and second anti-friction bearings, a pipe support plate carrying a pipe and being supported upon the first of the anti-friction bearings, and the pipe support plate carrying at opposite ends thereof depending side plates having projections underlying the second anti-friction bearings to prevent the pipe support plate from lifting off the bearing support.
Figure 2:
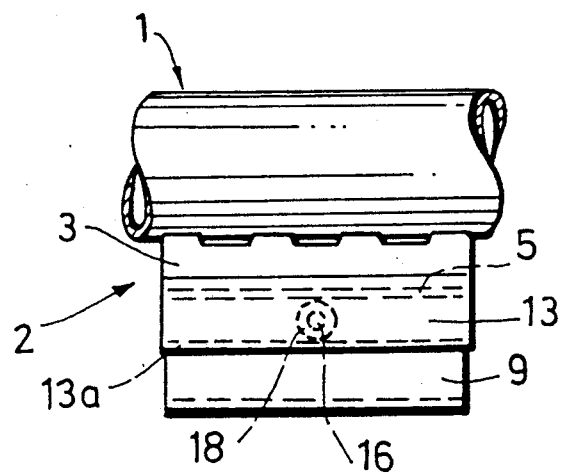
FIG. 2 is a reduced side elevational view of the pipe support of FIG. 1, and illustrates the manner in which an associated pipe is supported therupon.

A pipe or conduit 1 (FIGS. 1 and 2) is illustrated in supported relationship upon a pipe support 2 of the present invention. The pipe 2 can be welded to webs 3, 3 which in turn is welded to a pipe support plate 5 of a generally arcuate configuration having laterally opposite ends 5a, 5b. The pipe support plate 5 rests upon first anti-friction bearing means or roller bearings 10, 10 of a bearing support 4. The pipe support plate 5 is curved so that it tangentially contacts exterior surfaces (unnumbered) of the roller bearings 10. Due to the arcuate curvature of the pipe support 5 which corresponds to the radius 6 from the axis of the pipe 1 to the exterior surface (unnumbered) of the pipe support 5, the pipe support 5 moves relatively easily both parallel to the axis of the pipe 1 and laterally thereto (left-to-right and vice versa in FIG. 1).

The bearing support 4 preferably includes a base plate 8 and two opposite lateral upstanding legs or arms 9, 9. The legs 9, 9 converge relative to each other in an upward direction away from the base plate 8. A bearing block 11 is located generally centrally upon the base plate 8 and receives ends of bearing pins 10a, 10a. The bearing pins 10a, 10a pass through openings (unnumbered) in the legs 9, 9 and are also received in openings or blind bores (unnumbered) of the bearing block 11. Obviously, the first anti-friction bearing means or roller bearings 10, 10 are journalled for rotation upon the pins 10a, 10a. Ends 16, 17 of the pins 10a project beyond the legs 9 and support thereupon second anti-friction bearing means or castors 18, 19, respectively. The second anti-friction bearing means or castors 18, 19 are loosely rotatably carried by or plugged on the ends 16, 17 of the bearing or journalling pins 10a, 10a. If found necessary or desirable, a cotter pin can be used to connect the castors 18, 19 to the ends 16, 17 of the pins 10a, 10a.

Side plates 13, 14 (FIG. 1) are welded to the lateral ends 5a, 5b, respectively, of the pipe support plate 5 or are removably secured thereto by bolts (not shown). The depending plates 13, 14 include respectively projections 13a, 14a which are directed generally toward each other and underlie the respective second anti-friction bearing means or castors 18, 19. The purpose of the projections 13a, 14a is to prevent the pipe support plate 5 from being lifted upwardly off the bearing rollers 10, 10 beyond a predetermined distance. The predetermined distance is the distance or gap between the projections 13a, 14a and the underlying opposing peripheral surface (unnumbered) of the respective castors 16, 17. In other words, should the pipe 1 contract and thereby create a lifting of the pipe support plate 5, the lifting will continue only until the projections 13a, 14a contact the respective castors 18, 19, and further lifting will thereafter be prevented. Thus, the maximum distance that the pipe support plate 5 can be lifted from the anti-friction bearings 10, 10 corresponds to the distance between the projections 13a, 14a and the respective castors 18, 19.

Obviously, the novel construction of the depending side plates 13, 14 and the associated projections 13a, 14a relative to the castors 18, 19, respectively, not only provided limited lift of the pipe support plate 5, but ease of access is also readily achieved simply by unbolting the side plates 13 and/or 14 from the lateral ends 5a, 5b of the pipe support plate 5.

In further keeping with this invention, it is possible to exclude the castors 18, 19 and simply permit the projections 13a, 14a to contact the ends 16, 17, respectively, of the pins 10a, 10a. Furthermore, it is also possible in keeping with this invention to provide the legs 9, 9 with fixed studs or pins which would project laterally outwardly from each leg 9 and overly the respective projections 13a, 14a. In such case the pins 10a would not include the projecting end 16, 17, and instead these ends would simply be received in the bores or openings (unnumbered) of the legs 9, 9. Thus, the ends 16, 17 and the castors 18, 19 would be eliminated, and in lieu thereof there would simply be a metallic projection carried by the legs 9, 9 in overlying relationship to the projections 13a, 14a.

Although a preferred embodiment of the invention has been specifically illustrated and described herein, it is to be understood that minor variations may be made in the apparatus without departing from the spirit and scope of the invention, as defined in the appended claims.

I claim:

1. A pipe support comprising a bearing support, first anti-friction bearing means carried by said bearing support for supporting thereon an associated pipe support plate, a side plate depending downwardly at each end of said pipe support plate, said bearing support having opposite sides each adjacent one of said side plates, and second anti-friction bearing means disposed between each depending side plate and an adjacent bearing support side for cooperating with said depending side plates during movement of said pipe support plate.

2. The pipe support as defined in claim 1 wherein said depending side plates each have an edge portion generally underlying an associated one of said second anti-friction bearing means.

3. The pipe support as defined in claim 1 wherein said depending side plates each have an edge portion generally underlying an associated one of said second anti-friction bearing means, and said side plate edge portions are directed generally toward each other.

4. The pipe support as defined in claim 1 wherein said depending side plates are permanently connected to said pipe support plate.

5. The pipe support as defined in claim 1 including bearing pin means for journalling said first and second anti-friction bearing means, said bearing pin means have ends disposed between said depending side plates and adjacent bearing support sides, and said second anti-friction bearing means are carried by said bearing pin means ends.

6. The pipe support as defined in claim 1 including bearing pin means for journalling said first and second anti-friction bearing means, said bearing pin means have ends disposed between said depending side plates and adjacent bearing support sides, said second anti-friction bearing means are carried by said bearing pin means ends, and said second anti-friction bearing means are casters loosely rotatable upon said bearing pin means ends.

7. The pipe support as defined in claim 1 wherein said first anti-friction bearing means is a double roller bearing collectively defining a generally shallow V-shaped axis of rotation.

8. The pipe support as defined in claim 1 wherein said pipe support plate and each of said side plates is constructed from a single piece of sheet metal.

9. The pipe support as defined in claim 1 wherein both said first and second anti-friction bearing means are disposed on the same side of said pipe support plate.

10. The pipe support as defined in claim 1 wherein said first anti-friction bearing means are located between said bearing support opposite sides.

11. The pipe support as defined in claim 10 wherein both said first and second anti-friction bearing means are disposed on the same side of said pipe support plate.

12. The pipe support as defined in claim 2 wherein said depending side plates are permanently connected to said pipe support plate.

13. The pipe support as defined in claim 2 including bearing pin means for journalling said first and second anti-friction bearing means, said bearing pin means have ends disposed between said depending side plates and adjacent bearing support sides, and said second anti-friction bearing means are carried by said bearing pin means ends.

14. The pipe support as defined in claim 2 including bearing pin means for journalling said first and second anti-friction bearing means, said bearing pin means have ends disposed between said depending side plates and adjacent bearing support sides, said second anti-friction bearing means are carried by said bearing pin means ends, and said second anti-friction bearing means are casters loosely rotatable upon said bearing pin means ends.

15. The pipe support as defined in claim 2 wherein said first anti-friction bearing means is a double roller bearing collectively defining a generally shallow V-shaped axis of rotation.

16. The pipe support as defined in claim 3 wherein said depending side plates are permanently connected to said pipe support plate.

17. The pipe support as defined in claim 3 including bearing pin means for journalling said first and second anti-friction bearing means, said bearing pin means have ends disposed between said depending side plates and adjacent bearing support sides, and said second anti-friction bearing means are carried by said bearing pin means ends.

18. The pipe support as defined in claim 3 including bearing pin means for journalling said first and second anti-friction bearing means, said bearing pin means have ends disposed between said depending side plates and adjacent bearing support sides, said second anti-friction bearing means are carried by said bearing pin means ends, and said second anti-friction bearing means are casters loosely rotatable upon said bearing pin means ends.

19. The pipe support as defined in claim 3 wherein said first anti-friction bearing means is a double roller bearing collectively defining a generally shallow V-shaped axis of rotation.

20. The pipe support as defined in claim 3 wherein said pipe support plate and each of said side plate is constructed from a single piece of sheet metal.

* * * * *